Feb. 25, 1969 R. J. HAMMOND 3,429,580

RECORD PLAYING MECHANISM

Filed Feb. 28, 1966 Sheet 1 of 4

INVENTOR
ROBERT J. HAMMOND

BY Brown, Jackson, Boettcher & Dienner
Atty

INVENTOR
ROBERT J. HAMMOND

BY Brown, Jackson, Boettcher & Dienner

Attys

RECORD PLAYING MECHANISM

Filed Feb. 28, 1966

INVENTOR
ROBERT J. HAMMOND

BY Brown, Jackson, Boettcher & Dienner
Atty

INVENTOR.
ROBERT J. HAMMOND
BY Brown, Jackson, Boettcher & Dienner
Attys.

United States Patent Office 3,429,580
Patented Feb. 25, 1969

3,429,580

RECORD PLAYING MECHANISM

Robert J. Hammond, Stevensville, Mich., assignor to V-M Corporation, Benton Harbor, Mich., a corporation of Michigan Filed Feb. 28, 1966, Ser. No. 530,454
U.S. Cl. 274—23 29 Claims
Int. Cl. G11b *17/06*

ABSTRACT OF THE DISCLOSURE

A record changer phonograph having means disposed above the deck, and to a substantial degree carried by the tone arm itself, for effecting tone arm operation during record playing, lifting and removing the tone arm from a played record, returning the tone arm inwardly and downwardly to the record, and for sizing the succeeding record.

My invention relates to record playing mechanisms and more particularly to tone arms for record changer phonographs and operating means for said tone arms.

In known record changer phonographs the tone arm is operated by a mechanism disposed beneath the base plate and turntable. Such means is not readily accessible for adjustment, replacement or repair and in order to obtain ready access thereto it is necessary to remove the base plate and associated parts.

It is an object of my invention to provide means whereby that disadvantage is avoided, and to that end I provide means disposed above the base plate and, to substantial degree, carried by the tone arm itself for effecting its operation during record playing, lifting and removal of the tone arm from the played record and sizing of the record. Such means is therefore readily accessible and has the further advantage of being of simpler construction and less expensive to construct than structures presently available. By so arranging the actuating means easier repair or adjustment, including repair by the simple expedient of substituting a new tone arm, is provided. More particularly, the tone arm carries means whereby it is set down, located accurately relative to the edge of the record, moves in across the record during reproduction thereof, is tripped at the termination of such reproduction, then is raised, swings out and is again set down.

It is another object of my invention to provide a simplified manner and means of record sizing. To that end I employ means carried by the tone arm itself for sensing the size of the record about to be played rather than employing more complicated mechanisms substantial portions of which are disposed beneath the base plate and therefore are not readily accessible for adjustment, repair or replacement.

Among the further advantages and novel aspects of my invention is the ability to (a) elevate the tone arm by contact of means, carried by it, with the record surface or exposed surface of the turntable, (b) employ gravity for swinging the tone arm, when raised, from a position overlying the central area of the record outwardly beyond the periphery of the record, (c) automatically raise the tone arm the same height above the stack of played records as said stack continues to rise, (d) employ a steering mechanism and wheel for operation of the tone arm in a direction both inwardly from the central portion of the record outwardly toward its periphery to a set down position and also back toward the center for playing of the record, (e) play any size of record, (f) play eccentric records, and (g) reduce the effects of external shocks to the tone arm.

Further, the objects and advantages of my invention will appear from the detailed description.

Figures 1, 2, 4:
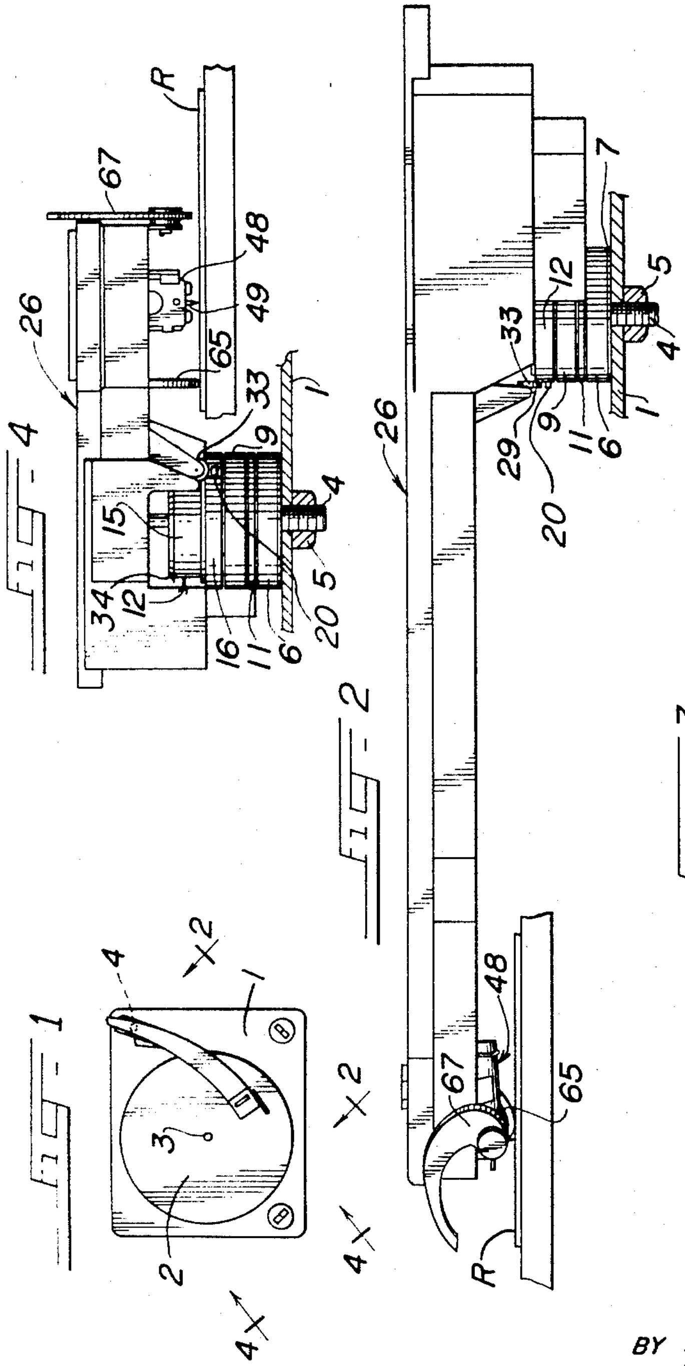
FIGURE 1 is a plan view, more or less schematic, of a base plate and turntable and associated parts, of conventional type except as to the tone arm, the usual record-holddown arm being omitted.
FIGURE 2 is an outer side view, taken substantially in the direction of the arrows 2—2 of FIGURE 1 and partly broken away, of the tone arm and the mounting means therefor, the base plate being shown fragmentarily and in section and the turntable and record being shown fragmentarily and in elevation.
FIGURE 4 is an end view, looking generally in the direction of the arrows 4—4 of FIGURE 1, of the tone arm and the mounting means therefor, the base plate being shown fragmentarily and in section, the turntable and record being shown fragmentarily and in elevation and the tone arm being shown approximately in the position it occupies when approaching its innermost position on the record.
Figure 3:
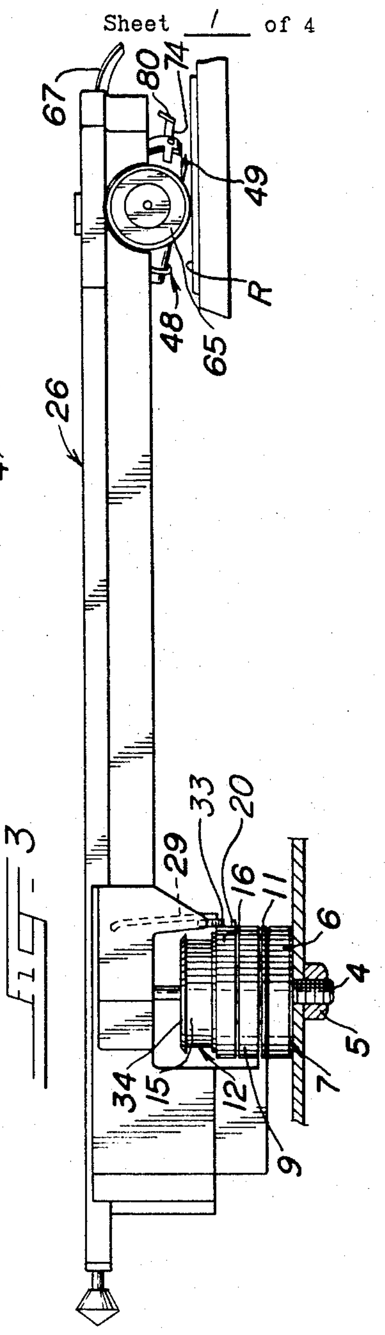
FIGURE 3 is an inner side view of the tone arm and the mounting means therefor, also partly broken away and with the base plate shown fragmentarily and in section and the turntable and record being shown fragmentarily and in elevation.
Figure 9:
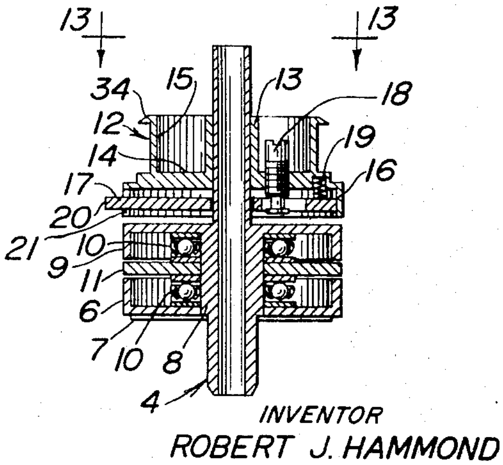
FIGURE 9 is a sectional view of the tone arm post and the parts mounted thereon, taken substantially on line 9—9 of FIGURE 8, the upper end portion of the tone arm being omitted.
Figure 10:
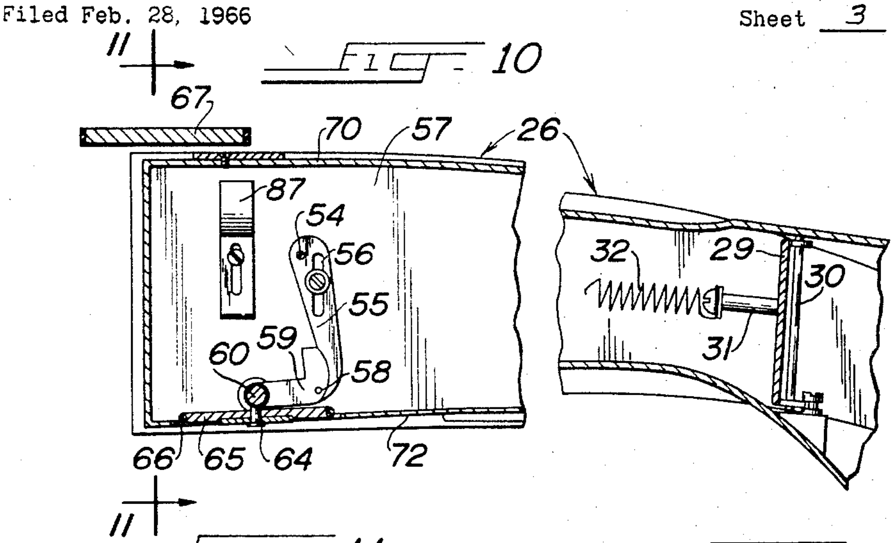
FIGURE 10 is a sectional view of the tone arm taken substantially on the line 10—10 of FIGURE 11, with the tone arm broken away in major portion and certain parts carried thereby omitted for clearness of illustration.

In FIGURE 1, I have shown rather schematically a base plate 1 on which is rotatably mounted a turntable 2 disposed about a spindle 3 of suitable known type having means for supporting thereon a stack of records positioned by a holddown arm (not shown), suitable known means being provided for releasing the bottom record of the stack for dropping onto the turntable 2. A tubular post 4, exteriorly threaded at its lower portion, is secured to base plate 1 at one corner thereof and in fixed angular relation thereto by a locknut 5. A lower upwardly opening cup disk 6, seating on a washer 7, is mounted on hub 8 (see FIG. 9) of post 4. The cup disk 6 is opposed to an inverted cup disk 9 at the upper end of hub 8, conveniently formed as a part thereof. The disks 6 and 9 receive ball bearings 10 disposed about hub 8, which have rotatably mounted between them the bight portion of a U-shaped mounting bracket 11, to be referred to more fully presently. The post 4 is of reduced diameter above hub 8 and slidably receives a cam member indicated generally by the reference numeral 12. The member 12 comprises a sleeve portion 13 slidable on the reduced upper portion of post 4, such sleeve extending upwardly from a web 14, a concentric upwardly extending collar 15 and a downwardly extending concentric flange 16 of somewhat greater diameter than the collar 15.

A latch plate 17 is rockably mounted, adjacent one side of post 4, on a headed stud extending downward from a screw 18 threaded through web 14. The end of plate 17 radially outwardly beyond screw 18 is urged downward by a compression spring 19. The plate 17 has a loose fit about the post 4 and normally is held by spring 19 in binding engagement therewith restraining downward movement of cam member 12 along the post, when the can member has been moved to a raised position, for a purpose to be described later. The plate 17 is provided at its other end with a finger 20 of reduced width which projects through a slot 21 in flange 16. The finger 20 fits snugly in slot 21 and precludes relative turning movement between cam member 12 and latch plate 17. The cam member 12 is provided with a radially extending screw 22, shown more clearly in FIGURE 13, which is threaded through collar 15 and extends through sleeve 13 into a lengthwise slot in the upper reduced portion of post 4. As a result the cam member 12 has limited upward movement along the post 4 and is effectively restrained against turning movement thereabout. Accordingly, with the post 4 fixedly secured in position, as above described, the finger 20 of latch plate 17 will at all times occupy a predetermined angular relation to the post 4.

Figure 8:
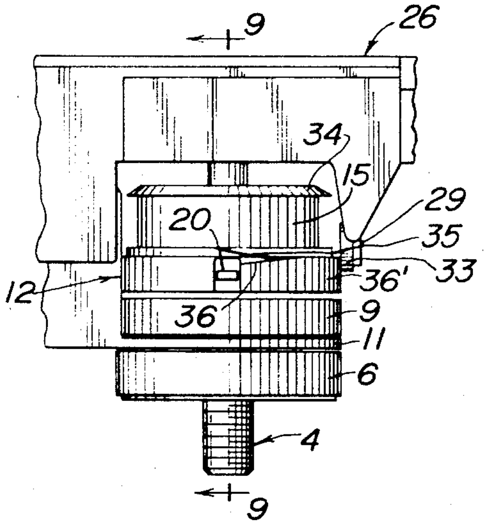
FIGURE 8 is a fragmentary elevational view, on an enlarged scale, of the inner side of the outer, or supported, end portion of the tone arm and the associated mounting means.
Figure 13:
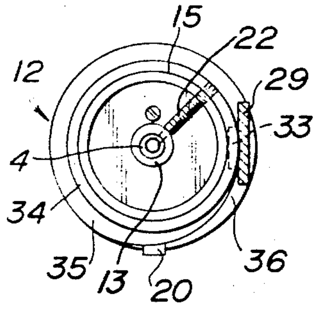
FIGURE 13 is a plan view, taken in the direction of the arrows 13—13 of FIGURE 9, of the cam disk and associated parts, the cam follower arm being shown in section.
Figure 14:
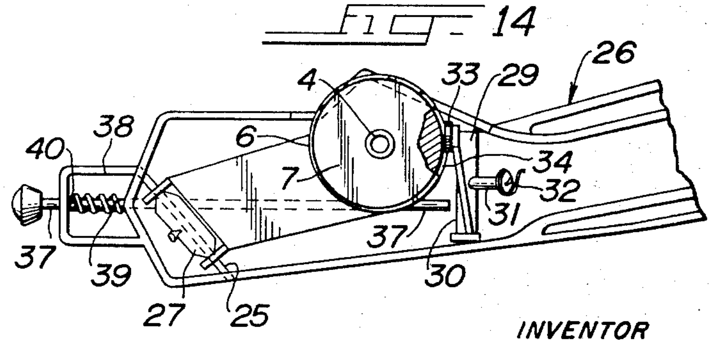
FIGURE 14 is a plan view of the outer end portion of the tone arm and associated parts viewed from the under side, with a portion of the structure broken away.
Figure 15:
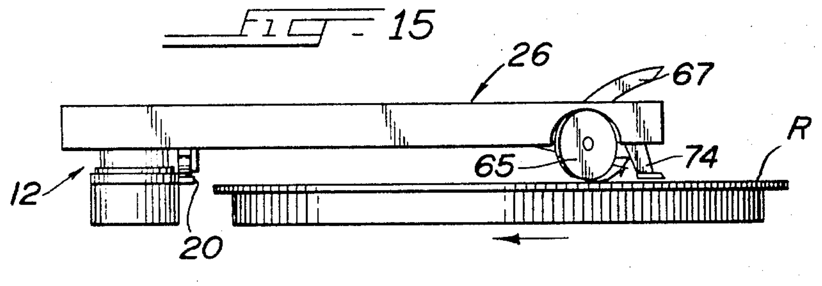
FIGURES 15, 16, 17 and 18 are semidiagrammatic views of the tone arm and its mounting means in association with the turntable and a record thereon showing the positions of the tone arm in successive steps of actuation thereof.

As shown more clearly in FIGURE 14, the arms of bracket 11 extend outwardly a material distance from the post 4 and receive, at their upper outer corners, a pivot pin 25 extending substantially diagonally of the outer end of a tone arm 26 and secured thereto. A spacing sleeve 27 is secured on the pin 25 between the arms of the bracket 11 and guards against objectionable relative transverse movement between the bracket and the tone arm. The tone arm is of substantially inverted U-shape in cross section and is slightly curved lengthwise, as is usual. A cam follower mounting arm 29 is rockably mounted, at its upper end, on a pivot rod 30 extending transversely of the tone arm 26, a short distance inwardly from the parts mounted on post 4, and secured at its ends in the side walls of the tone arm 26. A stud 31, secured to arm 29 a short distance from the upper edge thereof, extends inwardly of the tone arm and has secured to its inner end a spring 32 which bears against the top wall of the tone arm and urges the cam follower arm 29 toward the cam member 12. The arm 29 has rotatably mounted on its lower end and at its outer face a cam follower in the form of a small disk or roller 33. The spring 32 normally holds the cam follower 33 in light pressure contact with the circumferential surface of cam member 12, between an upper outwardly extending circumferential flange 34 at the top of member 12 and two oppositely inclined cam tracks 35 and 36 of cam member 12. Referring to FIGURES 8 and 13, it will be noted that the terminal portion of cam track 35 is inclined downwardly counterclockwise, as viewed in FIGURE 13, and extends beyond finger 20 of latch plate 17, and the terminal portion of cam track 36 is inclined downwardly clockwise and terminates at finger 20. As will be understood from what has been said, the tone arm 26 is swingable about the axis of post 4 and is also movable vertically about its pivot pin 25. The weight of the tone arm is effective for holding the cam follower 33 in light pressure contact with one or the other of the cam tracks 35 and 36, and is also effective for depressing finger 20, when cam follower 33 seats on finger 20, thereby releasing the cam member 12 from post 4 for downward movement therealong from an upper position to which it has previously been raised, as will be explained more fully later. Further, when the tone arm is raised, by means hereinafter explained, the cam follower engages beneath flange 34 of cam member 12 thereby moving cam member 12 to its raised position above mentioned.

As shown more clearly in FIGURE 14, a cam follower release rod 37 is slidably mounted through the outer end wall of tone arm 26 and through the outer end wall of an extension 38 of the tone arm. The rod 37 normally is held in retracted position by a compression spring 39 confined between the end wall of tone arm 26 and a stop 40 secured through rod 37. When the rod 37 is in its normal retracted position, the inner end thereof is disposed a short distance below the pivot rod 30 of arm 29 and a short distance outward of the latter. By projecting the rod 37 inward, the arm 29 and the cam follower 33 may be swung clear of the cam member 12 and the tone arm 26 may then be raised without affecting cam member 12, as will be understood, to give ready access to the parts carried by the tone arm.

A counter-balanced cartridge mounting arm 43 (FIG. 5) is pivoted at 44 for movement about a vertical axis on an inverted U-shaped bracket 45, rockably mounted on a cross rod 46, the end portions of which are mounted in bosses 47 extending inwardly from the side walls of tone arm 26 and disposed a short distance from the inner, or forward, end thereof. The arms of bracket 45 are disposed in close proximity to the bosses 47 and in cooperation therewith restrain bracket 45 and the cartridge arm 43 against objectionable movement transversely of the one arm. As will be understood, the bracket 45 underlies the top wall of the tone arm 26 and is spaced downwardly therefrom, and the cartridge mounting arm 43 is mounted for horizontal turning movement about the pivot axis 44 and for vertical movement about the cross rod 46. A cartridge 48, of conventional type, is secured to arm 43 at the under-face and adjacent the inner end thereof and is provided with the usual stylus 49 for engagement in the groove of the record being reproduced, and with conductors or leads 50 which pass outwardly along the arm 26 and through the tubular post 4 to the reproducing means, as is known.

Figure 6:
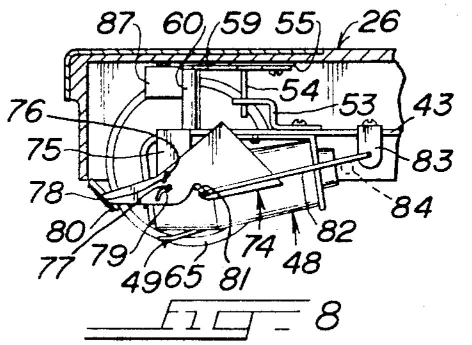
FIGURE 6 is a sectional view taken substantially on line 6—6 of FIGURE 5.

As shown in FIGURE 6, an angle tab 53 is fixed to the upper face of arm 43 at its cartridge carrying end. The tab 53 loosely receives the lower end portion of a pin 54 (FIGURES 6 and 11) extending downwardly from and fixed to an angle link 55 adjacent the free end thereof. The link 55 is mounted by pin and slot means 56 on the underface of the top wall 57 of tone arm 26. The outer end of link 55 is pivoted by a pin 58 to an arm 59 fixed on the upper end of a sleeve 60 (FIGURES 11 and 12) rotatably mounted on a headed pin 61 threaded at its upper end into top wall 57 of tone arm 26. The sleeve 60 underlies a substantially semicircular cam member 62 secured to top wall 57 of tone arm 26 in concentric and predetermined angular relation to the pin 61. The end of the arm 59 fixed to sleeve 60 is of approximately semicircular shape and provides a second cam member 63 which cooperates with the fixed cam member 62. The sleeve 60 is provided, adjacent its lower end, with an outwardly extending stub shaft 64 on which a tone arm supporting wheel 65, having a tire formed of rubber or other suitable comparatively soft material, is rotatably mounted. The wheel 65 is disposed closely adjacent an opening 66 in the inner side wall 72 of tone arm 26 spaced a short distance from the inner end thereof. As will appear more fully later, the wheel 65 is turned about pin 61, such movements of the wheel being accommodated by the opening 66.

Figure 7:
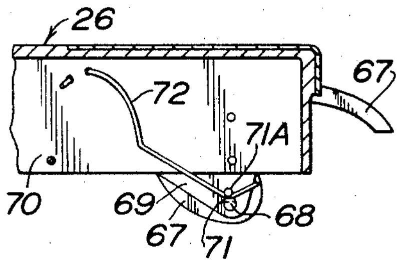
FIGURE 7 is a sectional view taken substantially on line 7—7 of FIGURE 5.
Figure 11:
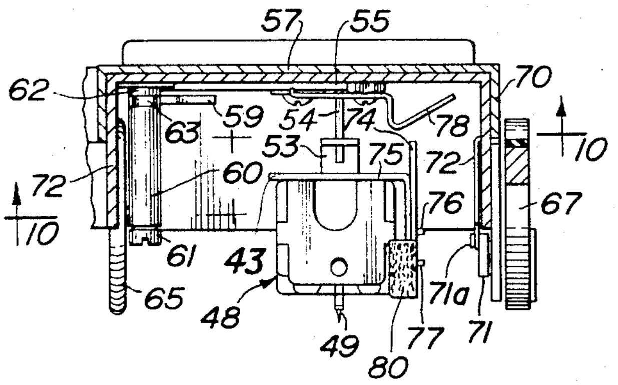
FIGURE 11 is a transverse vertical sectional view, taken approximately on the line 11—11 of FIGURE 10, of the tone arm taken adjacent the inner, or cartridge carrying, end thereof and on an enlarged scale.
Figure 12:
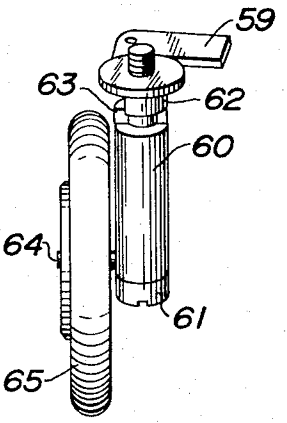
FIGURE 12 is a perspective view, on an enlarged scale, of the tone arm supporting wheel and the associated mounting and cam means.

As shown in FIGURES 7 and 11, an arcuate lifting cam 67, having its cam surface formed with a suitable frictional material for engaging but not injuring the surface of the record, is pivotally mounted by a pivot pin 68 on the outer side wall 70 of tone arm 26 opposite the wheel 65. As shown more clearly in FIGURE 7, pin 68 is mounted in the lower portion of a plate 69 secured to the outer face of side wall 70 of tone arm 26 and extending downward a short distance therebeyond. The pin 68 is provided at its inner end with a crank arm 71 having a pin 71A which is engaged by an over-center wire spring 72 anchored at its upper end to side wall 70. As will be understood, the lifting cam 67 normally is held by spring 72 and crank arm 71 in its raised position shown in FIGURE 7. The cam 67 then extends a slight distance below the plate 69, but its lower surface, when in the raised position, is slightly above the surface of the record which is being played.

Figure 5:
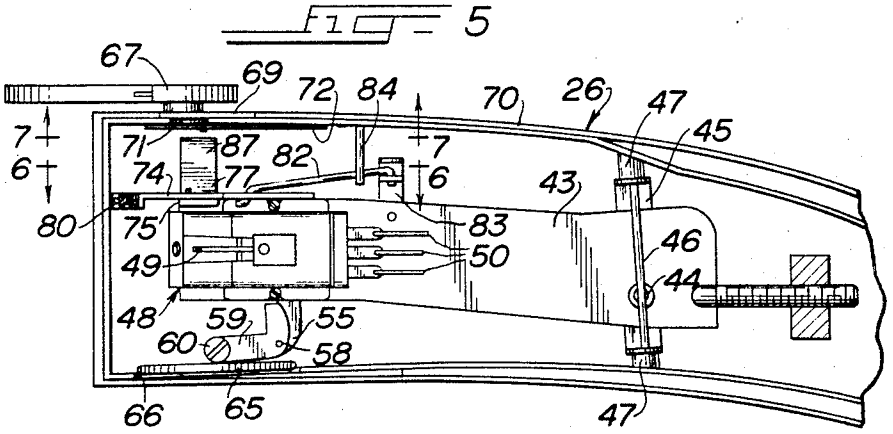
FIGURE 5 is an underneath view, on an enlarged scale, of the inner, or cartridge carrying, end portion of the tone arm and associated parts.

As may be seen from FIGURE 6, as well as FIGURES 5 and 11, a foot member 74 is mounted on a downwardly extending tab 75 at the outer side of the inner end of the cartridge supporting arm 43. It is mounted on the tab 75 by two spaced studs 76 and 77 extending through a straight slot and an arcuate slot 78 and 79, respectively, in the foot member 74, as shown more clearly in FIGURE 6. The foot member is provided at its lower end with a flat foot element 80, covered with felt or other suitable soft material, and is also provided, in its body portion, with a slot 81. If desired, the lower end of foot member 74 could have some other bearing surface, or a roller, which is noninjurious to the surface of a record. A link 82 is pivotally supported on a second tab 83 secured to arm 43 and extending downward therefrom a short distance inwardly of the cartridge 48. The link 82 overlies a stud 84 projecting inwardly from the outer side wall 70 of the tone arm 26 and at its other end the wire has an end movable in the slot 81 in foot member 74.

Figure 16:
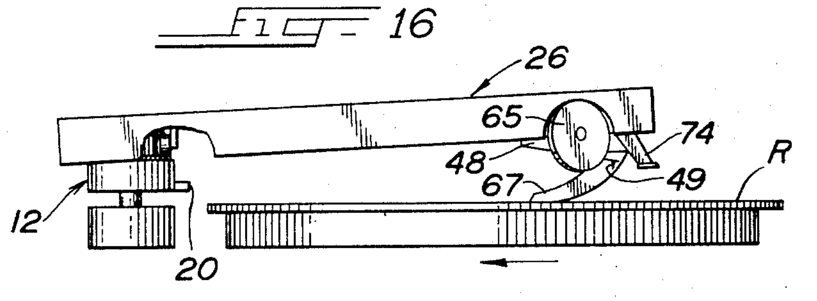
Figure 17:
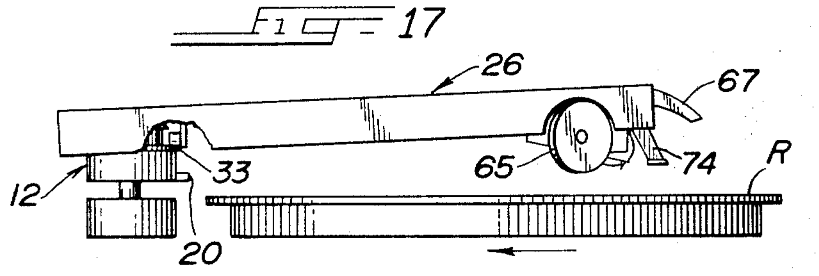
Figure 18:
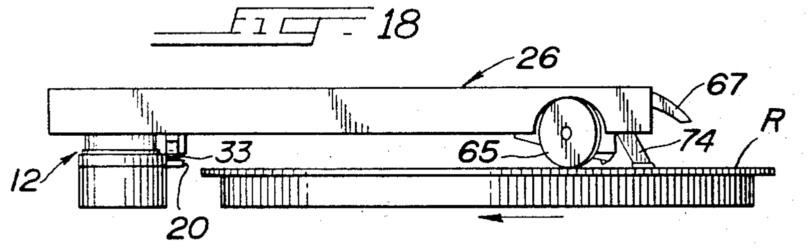

It may be assumed that the tone arm has been set down in proper position with the stylus 49 engaged in the lead-in groove of the record, the latter being rotated clockwise as viewed from above, as usual. By reason of its being connected through links 59 and 55 and pin 54 with the cartridge 48 the wheel 65 is then disposed at a slight inward angle, with cam member 63 of arm 59 seating against but beneath the fixed cam member 62. The wheel 65 then supports the weight of the tone arm and the inner end of the latter is held in a position such that the lifting cam 67 is spaced a slight distance above the face of the record. When the sylus reaches the inner portion of the record it enters the lead out groove, of increased pitch, and the cartridge arm 43 moves toward the wheel thereby turning the latter in counterclockwise direction, as viewed from above. That is effective for rotating the cam member 63 of arm 59 relative to the fixed cam member 62 so that their adjacent horizontal faces cease to engage each other and the fixed cam member 62 rides off of the movable cam member 63 so that the inner end of the tone arm drops a slight distance, sufficient to bring the lifting cam 67 into contact with the face of the rotating record R. When that occurs, cam 67 is turned counterclockwise, as viewed in FIGURE 7, through one complete rotation. Such turning of the cam 67 raises the inner end of the tone arm 26 (as in FIG. 16) thereby raising the cam member 12 to an upper position by contact of the cam follower 33 with the under face of flange 34. At that time the latch plate 17 holds the cam member 12 in its raised position, which thereby holds the tone arm 26 in a raised position, and cam follower 33 overlies the inclined terminal portion of the first or swing-out cam track 35. The lifting cam 67 is returned to normal raised position by the spring 72, and the tone arm 26 tends to lower and the cam follower 33 contacts the inclined cam surface 35 and in cooperation therewith swings the tone arm 26 outwardly beyond the record. At that time a new record is dropped from the supported stack onto the turntable by means well known to those skilled in the art.

When the inner end of the tone arm is raised by the lifting cam 67, the cartridge 48 drops downward a short distance, limited by contact of link 82 with stud 84 (see FIG. 6). Such contact causes the foot member 74 to be turned downward to a substantially vertical position by reason of the left end of link 82 (FIG. 6) acting in slot 81 in foot member 74 to cause the foot member to rotate around pins 76 and 79.

In the continued outward movement of the tone arm the cam follower 33 passes from the inclined cam surface 35 onto the oppositely inclined cam surface 36, which may be termed the swing-in cam surface thereby causing the tone arm 26 to terminate its outswing and then swing inward toward the record. As the cam follower reaches the lower end of the surface 36 it contacts finger 20 of the latch plate 17 thereby releasing the cam member 12 which drops to its lowered position lowering the tone arm 26 with it toward the record. The cam follower 33 is then disposed against the radially outward surface 36' of cam member 12. (See FIGURE 8.) As the tone arm 26 is lowered, foot member 74 which is in its generally vertical position, contacts the surface of the record and is pushed upward slightly relative to the cartridge 48 to place the foot member in a locked vertical position by reason of stud 77 entering the offset end of slot 79 when the studs 76 and 77 ride down in slots 78 and 79. Foot member 74 keeps the stylus of the cartridge from engaging the surface of the record while the wheel supports the tone arm. When the tone arm is moved inward to a position to set down on the new record, near the inner portion of the record, the wheel 65 is directed outwardly, due to the fact that when the foot element 80 of foot member 74 contacts the face of the record the upper end or body portion of foot member 74 contacts a cam member 87 secured to the under face of the top wall of the tone arm adjacent the side wall 70 thereof, cam member 78 slopes toward that wall 70, thereby camming the cartridge arm 43 toward that wall effective for turning the wheel to a position which will cause it to steer the tone arm outwardly toward the perimeter of the record. Enough camming action occurs between foot member 74 and cam member 78, before wheel 65 contacts the record, that the cam members 62 and 63 are properly disposed relative to each other to allow the wheel to be turned to the position just mentioned.

The tone arm is caused thereby to move outwardly of the record until the foot element 80 of foot member 74 passes off of the edge of the uppermost record. In its passage across the record the soft surface of foot element 80 of foot member 74 also acts as a record wiping means. When the foot member passes off the edge of the record it is returned by gravity to its normal raised position shown in FIGURE 6, by reason of foot member 74 sliding down studs 76 and 77 and then pivoting clockwise because of the weight of the greater part of foot member 74 being the right of studs 76 and 77. Foot member 74 then no longer engages cam element 87 and therefore no longer controls the direction of the wheel 65.

When the foot member 74 has passed off the edge of the record, the cartridge 48 and its stylus 49 descend, and the stylus 49 engages the lead-in groove of the record. After set-down, the tone arm moves inwardly of the record, under the guidance of the stylus, until the latter enters the lead-out groove, at which time the tone arm is again raised and swung outward in the manner above described.

The engagement of stylus 49 in the groove stops the lateral movement of the cartridge and its arm but does not stop the lateral movement outwardly which the tone arm continues to have by reason of its momentum. There is, therefore, a relative movement, laterally, between the tone arm and the cartridge 48 and its arm 43. Actually, the cartridge is not only stopped from lateral outward movement but is slightly reversed in direction by the lead-in groove, thereby accentuating the relative movement between the tone arm and the cartridge. This relative movement causes a steering of the wheel 65 through the steering linkage. This means that the contacting area of the wheel is rotated on the surface of the record.

This turning of the engaging surface of the wheel on the record has the effect of "putting on the brakes" for the tone arm. The force necessary to rotate the contacting surface of the wheel on the record comes from the stylus bearing against the sidewall of the groove in the record. However, the force required from the stylus to steer the wheel is very small under the dynamic conditions of operation due to low friction and essentially no wheel caster. The forces required to move the tone arm are an entirely different matter and do not reflect to the stylus.

Because the passage of the foot member 74 off of the edge of the record determines the time when and the place at which the tone arm is set down, it will be readily apparent that my invention provides for the playing of records of any size. Additionally, it permits correct setdown even for records which are eccentric in shape or which rotate eccentrically by reason of an enlarged or misplaced center hole.

Because the weight of the tone arm is supported on the record through the wheel 65 the effects of external shocks to the tone arm and record changer are minimized. Also, there is a reduction of friction in the tone arm bearings by reason of the supporting wheel and its steering geometry.

It will be understood that changes in detail may be resorted to without departing from the field and scope of my invention, and I intend to include all such variations, as fall within the scope of the appended claims, in this application in which the preferred form only of my invention has been disclosed.

I claim:

1. An improvement in a tone arm for a record playing mechanism which tone arm has means supporting a record playing stylus, said improvement comprising means adapted to engage the record and to support the record playing stylus in nonplaying position as the tone arm traverses the record, and additional means adapted to engage the record for supporting the tone arm wherein said supporting means for the tone arm is a steerable wheel supported by the tone arm adjacent the side closer to the center of the record and engageable with the record.

2. The improvement of claim 1 wherein the stylus is mounted in a cartridge which is pivotally mounted from the tone arm for movement in a generally horizontal direction and wherein the wheel is steerable in response to horizontal pivotal movement of the cartridge.

3. The improvement of claim 2 wherein the cartridge is directly linked to, and its position determines the angular position of, the steerable wheel.

4. An improvement in a tone arm for a record playing mechanism which tone arm has means supporting a record playing stylus, said improvement comprising means adapted to engage the record and to support the record playing stylus in nonplaying position as the tone arm traverses the record, and additional means adapted to engage the record for supporting the tone arm wherein the supporting means for the tone arm is connected with the tone arm and has an extended and a retracted position vertically with respect to the tone arm, the retracted position permitting the tone arm to come closer to the surface of the record, and wherein the record engaging means has a normally retracted position wherein it is out of engagement with the record.

5. An improvement in a tone arm for a record playing mechanism which tone arm has means supporting a record playing stylus, said improvement comprising means adapted to engage the record and to support the record playing stylus in a nonplaying position as the tone arm traverses the record, said stylus being mounted in a cartridge which is pivotally mounted from the tone arm for movement in a generally vertical direction, and said record engaging means being actuated to its operative position in response to vertical pivotal movement of said cartridge relative to the tone arm beyond an amount occurring during normal playing of the record.

6. The improvement of claim 5 together with operating means for said record engaging means, said operating means functioning in response to vertical movement of said cartridge downwardly relative to said tone arm.

7. The improvement of claim 6 together with means mounting said record engaging means in association with said cartridge and wherein said operating means moves said record engaging means toward its operative position where it is retained during its tone-arm-supporting position by the weight of the tone arm.

8. For use in a record playing mechanism, in combination, a tone arm adapted to be raised from and lowered toward the surface of a turntable or a record thereon and adapted to traverse said turntable or record, and arcuate cam means supported from the tone arm and adapted to engage said surface upon lowering of the tone arm for itself raising the tone arm.

9. The combination of claim 8 together with means for supporting said tone arm above said surface.

10. The combination of claim 9 wherein the means for supporting the tone arm above the record has an extended position and a retracted position vertically relative to the tone arm, the retracted position permitting the tone arm to be lowered to said certain level whereby said means for raising said tone arm engages said surface.

11. The improvement of claim 10 wherein the supporting means is a steerable wheel which has mounting means mounted for movement about a vertical axis, said mounting means at its upper end having a cam element for engagement with a cam element associated with the tone arm, said cam elements in one range of positions relative to each other maintaining the steerable wheel in said extended position and in another range of positions permitting the wheel to assume said retracted position.

12. The combination of claim 11 together with movable means connected with the tone arm for supporting a record playing stylus, and steering means operative between said movable means and said steerable wheel, angular movement of said movable means to a predetermined position conditioning said steerable wheel to assume said retracted position.

13. The combination of claim 9 wherein the means for raising the tone arm is a lifting cam movably supported from said tone arm.

14. The combination of claim 13 wherein said lifting cam is rotatably supported and has a frictional surface which, when engaged by said surface when the surface is moving, causes the cam to rotate and raise the tone arm.

15. The combination of claim 14 together with resilient means holding said cam means in a first position and adapted to return said lifting cam to said first position after it has performed its tone arm lifting operation.

16. The combination of claim 8 together with pivotal support means adapted to be associated with the record playing mechanism and said tone arm and about which the tone arm is pivotal in a generally horizontal direction and in a generally vertical direction and cam means and follower means cooperable between the pivotal support means and the tone arm for guiding the tone arm downwardly toward a record on the record playing mechanism after it has been raised by said means supported from the tone arm, said cam means comprising a pair of downwardly inclined, oppositely directed, cooperating guide surfaces for said follower means, and said follower means being operatively associated with the tone arm.

17. For use in a record playing mechanism, in combination, a tone arm, pivotal support means adapted to be associated with the record playing mechanism and said tone arm and about which the tone arm is pivotal in a generally horizontal direction and in a generally vertical direction, means for moving the tone arm away from a record playing position to a vertically raised position, and means for guiding the tone arm in its descent from said vertically raised position back toward the record on the record playing mechanism, said means for guiding the tone arm being rendered effective for guiding action by the tone arm itself when that arm is moved toward its vertically raised position.

18. The combination of claim 17 wherein the means for moving the tone arm away from the record playing position comprises means supported from the tone arm for itself raising the tone arm from the record playing position.

19. For use in a record playing mechanism, in combination, a tone arm, pivotal support means adapted to be associated with the record playing mechanism and said tone arm and about which the tone arm is pivotal in a generally horizontal direction and in a generally vertical direction, and means for guiding the tone arm in its descent from a vertically raised position back toward the record on the record playing mechanism, said guiding means being supported on said pivotal support means and vertically slidable therealong and adapted to be raised by said tone arm when the tone arm is raised.

20. The combination of claim 19 together with latch means adapted to retain the guiding means in its vertically raised position, said latch means being releasable following downward movement of said tone arm guided by said guiding means.

21. The combination of claim 19 wherein the guiding means includes an engagement surface and said tone arm includes means adapted to engage said engagement surface and to raise the guiding means when the tone arm is raised.

22. The combination of claim 21 wherein the means adapted to engage said engagement surface is a follower means and is resiliently urged toward said guiding means so as to be adapted to be guided by said guiding means and adapted to come into engagement with said engagement surface.

23. The combination of claim 22 together with means for selectively disassociating said follower means from said guiding means.

24. For use in a record playing mechanism which has a tone arm with movable means supporting a record playing stylus and with pivotal support means adapted to be associated with a record playing mechanism and said tone arm and about which the tone arm is pivotal in a generally horizontal direction and in a generally vertical direction, the improvement comprising means adapted to engage the record and to support the record playing stylus in nonrecording position, said record engaging means having a normally retracted position wherein it is out of engagement with the record; means for supporting the tone arm as the tone arm traverses the record; means supported from the tone arm for itself raising the tone arm by engagement with a surface of a record when the tone arm is lowered to a predetermined level; said means for supporting said tone arm being constructed to permit lowering of the tone arm, when said means is in a certain position, whereby said means for raising the tone arm becomes operative; means for guiding the tone arm in its descent from a vertically raised position back toward the record, said guiding means being adapted to direct the tone arm downwardly and outwardly beyond the periphery of a record and then downwardly and inwardly toard the central portion of the record; said movable support means for the stylus then being supported out of engagement with the record by said record engaging means; steering means operatively disposed between said movable support means for the stylus and said means for supporting the tone arm; said means for supporting the tone arm being adapted to guide the tone arm to the periphery of the record; said record engaging means being adapted to ride off the edge of the record and to permit set down of said stylus on the lead-in groove of the record.

25. For use in a record playing mechanism which has a tone arm with movable means supporting a record playing stylus, pivotal support means adapted to be associated with a record playing mechanism and said tone arm and about which the tone arm is pivotal in a generally horizontal direction and in a generally vertical direction and means for raising and lowering said tone arm toward said record, the improvement comprising means adapted to engage the record and to support the record playing stylus in nonrecording position, said record engaging means having a normally retracted position wherein it is out of engagement with the record; means adapted to contact the record for supporting the tone arm as the tone arm traverses the record; said movable means supporting the record playing stylus comprising a cartridge which is pivotally mounted from the tone arm for movement in a generally vertical direction and in a generally horizontal direction; said supporting means for the tone arm comprising a steerable wheel being connected by steering means to the cartridge which supports the record playing stylus whereby the wheel is steered by the movement of said cartridge; cam means associated with the tone arm; said record engaging means, when in its operative position and when the tone arm is being lowered toward the record, being adapted to engage said cam means thereby to cam the cartridge to steer the steerbale wheel into a position whereby it will direct the tone arm toward the periphery of the record; said record engaging means when is rides off the periphery of the record being adapted to return to its retracted position and permitting the tone arm to be set down with the stylus in a lead-in groove of the record, whereupon the cartridge steers the supporting wheel to cause it to be steered and support the tone arm in the tone arm's movement toward the central portion of the record.

26. For use in a record playing mechanism, in combination, a tone arm, pivotal support means adapted to be associated with the record playing mechanism and said tone arm and about which the tone arm is pivotal in a generally horizontal direction and in a generally vertical direction, means for guiding the tone arm in its descent from a vertically raised position back toward the record on the record playing mechanism, said guiding means comprising a first guiding surface adapted to direct the tone arm downwardly toward and outwardly beyond the periphery of the record, together with follower means associated with said tone arm and adapted to follow said first guiding surface, and a second guiding surface adapted to receive the follower means from said first guiding surface and guide it downwardly and inwardly toward the central portion of a record on said record playing mechanism.

27. An improvement in a tone arm for a record playing mechanism which tone arm has means supporting a record playing stylus, said improvement comprising a steerable wheel supported by the tone arm and adapted to engage the surface of the record as the tone arm and stylus traverse the record.

28. The improvement of claim 27 wherein the stylus is mounted in a cartridge which is pivotally mounted on the tone arm for movement in a generally horizontal direction relative to said tone arm, and wherein the wheel is steerable in response to said horizontal pivotal movement of the cartridge.

29. The improvement of claim 28 wherein said cartridge is also pivotally mounted on the tone arm for vertical movement relative to the tone arm, together with camming means carried by the tone arm which camming means is adapted to be engaged during an upward vertical movement of the cartridge relative to the tone arm, whereby the cartridge is cammed horizontally to steer the steerable wheel.

(References on following page)

References Cited

UNITED STATES PATENTS

| | | | |
|---|---|---|---|
| 2,216,029 | 9/1940 | Wright | 274—15 |
| 2,370,875 | 3/1945 | Pressley | 274—15 |
| 2,586,422 | 2/1952 | Fisher | 274—23 |
| 2,949,311 | 8/1960 | Machts et al. | 274—23 |
| 2,982,554 | 5/1961 | Lindgren | 274—15 |
| 3,122,370 | 2/1964 | Hansen | 274—39.1 X |
| 2,819,088 | 1/1958 | Boisselier et al. | 274—23 |
| 2,958,529 | 11/1960 | King | 274—47 |
| 3,085,806 | 4/1963 | Sariti et al. | 274—36 |

FOREIGN PATENTS

| | | |
|---|---|---|
| 1,108,455 | 6/1961 | Germany. |

HARRY N. HAROIAN, *Primary Examiner.*

U.S. Cl. X.R.

274—15